(12) United States Patent
Zhang

(10) Patent No.: US 11,345,310 B2
(45) Date of Patent: May 31, 2022

(54) CHILD SAFETY SEAT AND ASSEMBLY SYSTEM WARNING DEVICE THEREOF

(71) Applicant: Bambino Prezioso Switzerland AG, Steinhausen (CH)

(72) Inventor: Da Liang Zhang, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 0 days.

(21) Appl. No.: 17/016,391

(22) Filed: Sep. 10, 2020

(65) Prior Publication Data

US 2021/0070247 A1 Mar. 11, 2021

(30) Foreign Application Priority Data

Sep. 10, 2019 (CN) .................. 201910855969.X

(51) Int. Cl.
*B60R 22/48* (2006.01)
*B60R 16/023* (2006.01)
*B60R 22/10* (2006.01)
*B60R 22/26* (2006.01)
*B60N 2/28* (2006.01)

(52) U.S. Cl.
CPC ............ *B60R 22/48* (2013.01); *B60R 16/023* (2013.01); *B60R 22/105* (2013.01); *B60R 22/26* (2013.01); *B60N 2/2803* (2013.01); *B60N 2/2839* (2013.01); *B60N 2/2887* (2013.01); *B60N 2002/2815* (2013.01); *B60R 2022/4808* (2013.01); *B60R 2022/4866* (2013.01)

(58) Field of Classification Search
CPC ..... B60R 22/48; B60R 16/023; B60R 22/105; B60R 22/26; B60R 2022/4808; B60R 2022/4866; B60N 2/2803; B60N 2/2839; B60N 2/2887; B60N 2002/2815
See application file for complete search history.

(56) References Cited

U.S. PATENT DOCUMENTS

| | | | | |
|---|---|---|---|---|
| 5,515,933 A * | 5/1996 | Meyer | ................... | B60N 2/002 180/273 |
| 6,419,199 B1* | 7/2002 | Skofljanec | ............... | B60N 2/28 24/633 |
| 8,063,788 B1* | 11/2011 | Morningstar | .......... | G08B 21/24 340/667 |
| 10,065,529 B1* | 9/2018 | Miranda Nieto | ........ | B60N 2/06 |

(Continued)

FOREIGN PATENT DOCUMENTS

| | | |
|---|---|---|
| CN | 205344579 U | 6/2016 |
| CN | 205381165 U | 7/2016 |

(Continued)

*Primary Examiner* — Philip F Gabler
(74) *Attorney, Agent, or Firm* — Winston Hsu

(57) ABSTRACT

An assembly system warning device includes a first assembly member, a second assembly member, a main circuit, a power supply, an alarm device, a first circuit, a first switch, a second circuit and a second switch. When the first assembly member is located at an assembly position and the second assembly member is located at an idle position, the main circuit and the second circuit are connected in series to form a closed circuit. When the second assembly member is located at an assembly position and the first assembly member is located at an idle position, the main circuit and the first circuit are connected in series to form a closed circuit.

21 Claims, 12 Drawing Sheets

(56) References Cited

U.S. PATENT DOCUMENTS

| | | | |
|---|---|---|---|
| 10,068,459 | B2 | 9/2018 | Mimis |
| 2002/0163171 | A1 | 11/2002 | Kraft |
| 2003/0098194 | A1 | 5/2003 | Roddy |
| 2005/0092539 | A1 | 5/2005 | Chitalia |
| 2006/0049677 | A1 | 3/2006 | Lawrence |
| 2006/0250093 | A1 | 11/2006 | Kumar |
| 2008/0164990 | A1* | 7/2008 | Anderson ............ B60N 2/2821 340/457 |
| 2017/0129399 | A1 | 5/2017 | Appukutty |
| 2017/0182938 | A1* | 6/2017 | Byrd, I .................. G08B 21/24 |
| 2017/0221333 | A1* | 8/2017 | Jackson .................. E05F 15/71 |

FOREIGN PATENT DOCUMENTS

| | | |
|---|---|---|
| CN | 208271356 U | 12/2018 |
| CN | 109177830 A | 1/2019 |
| JP | 2003-516903 A | 5/2003 |
| JP | 2005-247277 A | 9/2005 |
| JP | 2007-168458 A | 7/2007 |
| JP | 2009-507329 A | 2/2009 |
| JP | 2017-208180 A | 11/2017 |
| WO | 2016/127118 A1 | 8/2016 |

\* cited by examiner

CHILD SAFETY SEAT AND ASSEMBLY SYSTEM WARNING DEVICE THEREOF

BACKGROUND OF THE INVENTION

1. Field of the Invention

The invention relates to a safety seat and, more particularly, to a child safety seat and an assembly system warning device thereof.

2. Description of the Prior Art

A child safety seat is a seat specially designed for a child. The child safety seat can be assembled into a vehicle for seating a child. The child safety seat restrains the child from moving to ensure safety for the child.

The bottom of the child safety seat is usually fixed on the vehicle seat by ISOFIX and the top of the child safety seat has a top tether with an engaging structure capable of being connected to a corresponding port of the vehicle. However, when a user assembles the child safety seat into the vehicle, two conditions below may occur. First, after connecting the ISOFIX of the child safety seat to the vehicle seat, the user may forget to connect the top tether of the child safety seat to the vehicle. Second, after connecting the top tether of the child safety seat to the vehicle, the user may forget to connect the ISOFIX of the child safety seat to the vehicle seat. The aforesaid two conditions represent that the child safety seat have not been assembled into the vehicle completely yet, such that it cannot ensure safety for the child well during travel.

Therefore, an assembly system warning device and a child safety seat equipped with the device are necessary for warning the user of uncompleted and incorrect assembly.

SUMMARY OF THE INVENTION

An objective of the invention is to provide an assembly system warning device capable of warning the user of uncompleted and incorrect assembly.

Another objective of the invention is to provide a child safety seat equipped with an assembly system warning device capable of warning the user of uncompleted and incorrect assembly of the child safety seat.

According to an embodiment of the invention, an assembly system warning device is disposed on a child safety seat. The assembly system warning device comprises a first assembly member, a second assembly member, a main circuit, a first circuit, a second circuit, a first switch and a second switch. The first assembly member and the second assembly member are configured to assemble the child safety seat into a vehicle. Each of the first assembly member and the second assembly member has an assembly position and an idle position with respect to the child safety seat. The main circuit has a first end and a second end and is connected in series with a power supply and an alarm device. The first switch has a first end electrically connected to the first end of the main circuit and a second end selectively and electrically connected between the first circuit and the second circuit. The second switch has a first end electrically connected to the second end of the main circuit and a second end selectively and electrically connected between the first circuit and the second circuit. When the first assembly member is located at the assembly position and the second assembly member is located at the idle position, the main circuit and the second circuit are connected in series to form a closed circuit. When the second assembly member is located at the assembly position and the first assembly member is located at the idle position, the main circuit and the first circuit are connected in series to form a closed circuit.

Compared to the prior art, when the first assembly member is located at the assembly position and the second assembly member is located at the idle position, the first assembly member triggers the second end of the first switch to be disconnected from the first circuit and electrically connected to the second end of the second circuit, such that the main circuit and the second circuit are connected in series to form a closed circuit and then the alarm device is turned on to send out an alarm for warning the user that the second assembly member has not been connected to the vehicle yet, i.e. warning the user of uncompleted and incorrect assembly. When the second assembly member is located at the assembly position and the first assembly member is located at the idle position, the second assembly member triggers the second end of the second switch to be disconnected from the second circuit and electrically connected to the second end of the first circuit, such that the main circuit and the first circuit are connected in series to form a closed circuit and then the alarm device is turned on to send out an alarm for warning the user that the first assembly member has not been connected to the vehicle yet, i.e. warning the user of uncompleted and incorrect assembly. When the first assembly member and the second assembly member both are located at the assembly positions or the idle positions, i.e. the first assembly member and the second assembly member both have or have not been assembled into the vehicle, the main circuit, the first circuit and the second circuit form an open circuit, such that the alarm device is turned off and does not send out an alarm.

Preferably, when the first assembly member is located at the assembly position and the second assembly member is located at the idle position, the first assembly member triggers the second end of the first switch to be disconnected from the first circuit and electrically connected to the second circuit, so as to form a closed circuit and send out an alarm; when the second assembly member is located at the assembly position and the first assembly member is located at the idle position, the second assembly member triggers the second end of the second switch to be disconnected from the second circuit and electrically connected to the first circuit, so as to form a closed circuit and send out an alarm.

Preferably, when the first assembly member and the second assembly member are located at the assembly positions, the first assembly member and the second assembly member extend from the child safety seat; when the first assembly member and the second assembly member are located at the idle positions, the first assembly member and the second assembly member are stored at storage positions of the child safety seat.

Preferably, at least one of the first assembly member and the second assembly member is an abutting member or an anchor member.

Preferably, the abutting member is a spin-preventing supporting device or a rebound bar of the child safety seat.

Preferably, the anchor member is a top tether, an ISOFIX fixing member or a seat belt fastener.

Preferably, the assembly system warning device further comprises a third switch, a third circuit, a fourth circuit and a third assembly member configured to assemble the seat body into the vehicle. A first end of the third switch is electrically connected to the second circuit. A first end of the third circuit is electrically connected to the first circuit. The third circuit has a first diode. A first end of the fourth circuit is electrically connected to the first circuit. The fourth circuit has a second diode. A current conducting direction of the first diode is opposite to a current conducting direction of the second diode. The third assembly member has an assembly position and an idle position with respect to the seat body. When the first assembly member, the second assembly member and the third assembly member are located at the idle positions, a second end of the third switch is electrically connected to a second end of the third circuit and the first diode is turned off. When the third assembly member is located at the assembly position and the first assembly member and the second assembly member are located at the idle positions, the third assembly member triggers the second end of the third switch to be electrically connected to a second end of the fourth circuit and the second diode is turned on, so as to form a closed circuit and send out an alarm.

Preferably, when the first assembly member, the second assembly member and the third assembly member are located at the assembly positions, the first assembly member, the second assembly member and the third assembly member extend from the child safety seat; when the first assembly member, the second assembly member and the third assembly member are located at the idle positions, the first assembly member, the second assembly member and the third assembly member are stored at storage positions of the child safety seat.

Preferably, the third assembly member is an abutting member or an anchor member.

Preferably, the abutting member is a spin-preventing supporting device or a rebound bar of the child safety seat.

Preferably, the anchor member is a top tether, an ISOFIX fixing member or a seat belt fastener.

Preferably, a first driving unit is disposed between the first assembly member and the first switch; when the first assembly member moves to the assembly position and drives the first driving unit to move, the first driving unit triggers the second end of the first switch to be disconnected from the first circuit and electrically connected to the second circuit.

Preferably, the first driving unit comprises a first driving member, the first driving member is pivotally connected to the seat body, the first assembly member is disposed on the first driving member; when the first assembly member drives the first driving member to rotate, the first driving member pushes and triggers the first switch.

Preferably, the first driving unit further comprises an elastic member configured to return the first driving member, the elastic member is disposed between the first driving member and the seat body; when the first assembly member drives the first driving member to rotate, the first driving member compresses the elastic member.

Preferably, a second driving unit is disposed between the second assembly member and the second switch; when the second assembly member moves to the assembly position and drives the second driving unit to move, the second driving unit triggers the second end of the second switch to be disconnected from the second circuit and electrically connected to the first circuit.

Preferably, the second driving unit comprises an unlock member and a second driving member, the unlock member is disposed on the second assembly member, the second driving member is connected to the unlock member; when the second assembly member drives the unlock member to move, the unlock member drives the second driving member to push and trigger the second switch.

According to another embodiment of the invention, a child safety seat comprises a seat body and an assembly system warning device. The assembly system warning device is disposed on the seat body. The assembly system warning device comprises a first assembly member, a second assembly member, a main circuit, a first circuit, a second circuit, a first switch and a second switch. The first assembly member and the second assembly member are configured to assemble the seat body into a vehicle. Each of the first assembly member and the second assembly member has an assembly position and an idle position with respect to the seat body. The main circuit has a first end and a second end and is connected in series with a power supply and an alarm device. The first switch has a first end electrically connected to the first end of the main circuit and a second end selectively and electrically connected between the first circuit and the second circuit. The second switch has a first end electrically connected to the second end of the main circuit and a second end selectively and electrically connected between the first circuit and the second circuit. When the first assembly member is located at the assembly position and the second assembly member is located at the idle position, the main circuit and the second circuit are connected in series to form a closed circuit. When the second assembly member is located at the assembly position and the first assembly member is located at the idle position, the main circuit and the first circuit are connected in series to form a closed circuit.

Compared to the prior art, the child safety seat of the invention is equipped with the assembly system warning device. When the first assembly member is located at the assembly position and the second assembly member is located at the idle position, the first assembly member triggers the second end of the first switch to be disconnected from the first circuit and electrically connected to the second end of the second circuit, such that the main circuit and the second circuit are connected in series to form a closed circuit and then the alarm device is turned on to send out an alarm for warning the user that the second assembly member has not been connected to the vehicle yet, i.e. warning the user of uncompleted and incorrect assembly. When the second assembly member is located at the assembly position and the first assembly member is located at the idle position, the second assembly member triggers the second end of the second switch to be disconnected from the second circuit and electrically connected to the second end of the first circuit, such that the main circuit and the first circuit are connected in series to form a closed circuit and then the alarm device is turned on to send out an alarm for warning the user that the first assembly member has not been connected to the vehicle yet, i.e. warning the user of uncompleted and incorrect assembly. When the first assembly member and the second assembly member both are located at the assembly positions or the idle positions, i.e. the first assembly member and the second assembly member both have or have not been assembled into the vehicle, the main circuit, the first circuit and the second circuit form an open circuit, such that the alarm device is turned off and does not send out an alarm.

These and other objectives of the present invention will no doubt become obvious to those of ordinary skill in the art after reading the following detailed description of the preferred embodiment that is illustrated in the various figures and drawings.

DETAILED DESCRIPTION

The following detailed description of the preferred embodiments is illustrated in the various figures and drawings, and the invention is not limited to these embodiments.

Figure 1:
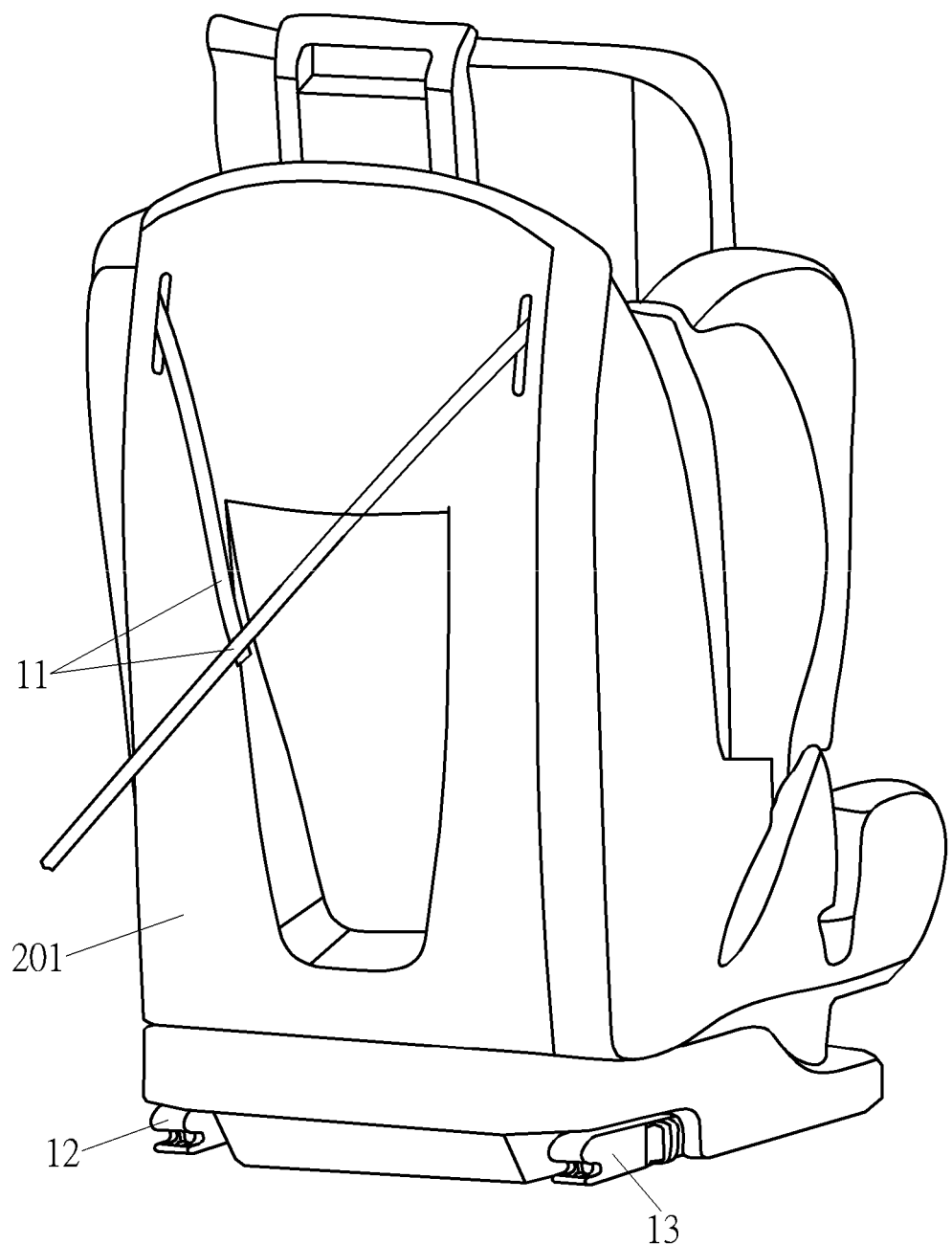
FIG. 1 is a schematic view illustrating a child safety seat of the invention.

Referring to FIG. 1, a child safety seat 200 of the invention comprises a seat body 201 and an assembly system warning device 100. The assembly system warning device 100 is disposed on the seat body 201 of the child safety seat 200.

Referring to FIGS. 2 to 5, in a first embodiment of the invention, the assembly system warning device 100 comprises a first assembly member 11 and a second assembly member 12 configured to assemble the seat body 201 into a vehicle. Each of the first assembly member 11 and the second assembly member 12 has an assembly position and an idle position with respect to the seat body 201. When the first assembly member 11 and the second assembly member 12 are located at the assembly positions, the first assembly member 11 and the second assembly member 12 extend from the seat body 201. When the first assembly member 11 and the second assembly member 12 are located at the idle positions, the first assembly member 11 and the second assembly member 12 are stored at storage positions of the seat body 201. When the first assembly member 11 and the second assembly member 12 both are assembled to the assembly positions, the seat body 201 of the child safety seat 200 is assembled into the vehicle completely, i.e. the seat body 201 is assembled onto the vehicle seat stably and safely. At least one of the first assembly member 11 and the second assembly member 12 is an abutting member or an anchor member. The abutting member is a spin-preventing supporting device or a rebound bar of the child safety seat. The anchor member is a top tether, an ISOFIX fixing member or a seat belt fastener. In this embodiment, the first assembly member 11 is, but not limited to, a top tether and the second assembly member 12 is, but not limited to, an ISOFIX fixing member. The first assembly member 11 may also be an ISOFIX fixing member, a spin-preventing supporting device, a rebound bar of the child safety seat, a seat belt fastener, and so on. The second assembly member 12 may also be a spin-preventing supporting device, a rebound bar of the child safety seat, a seat belt fastener, and so on.

Figure 2:
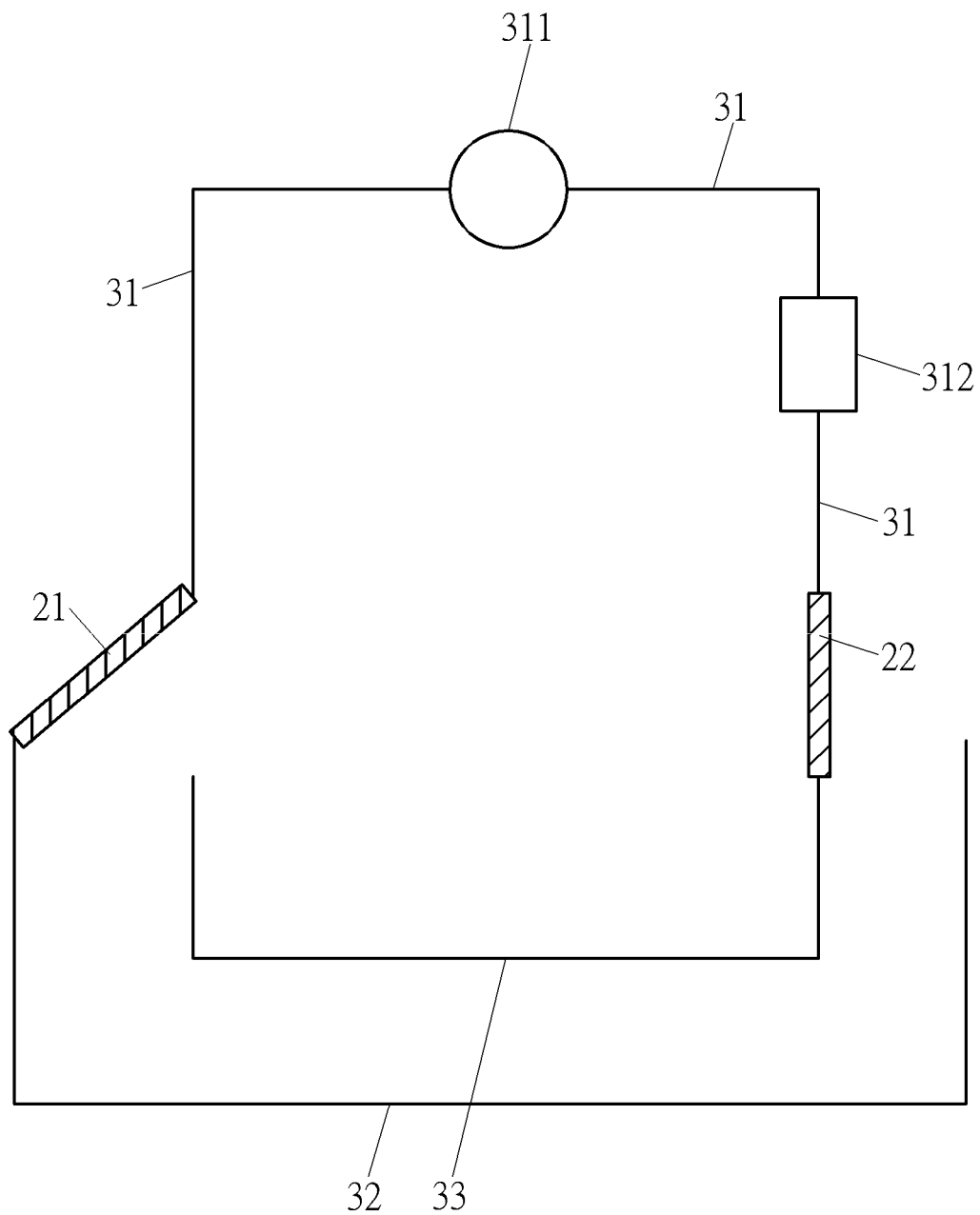
FIG. 2 is a schematic view illustrating a circuit of an assembly system warning device of a first embodiment of the invention.
Figure 3:
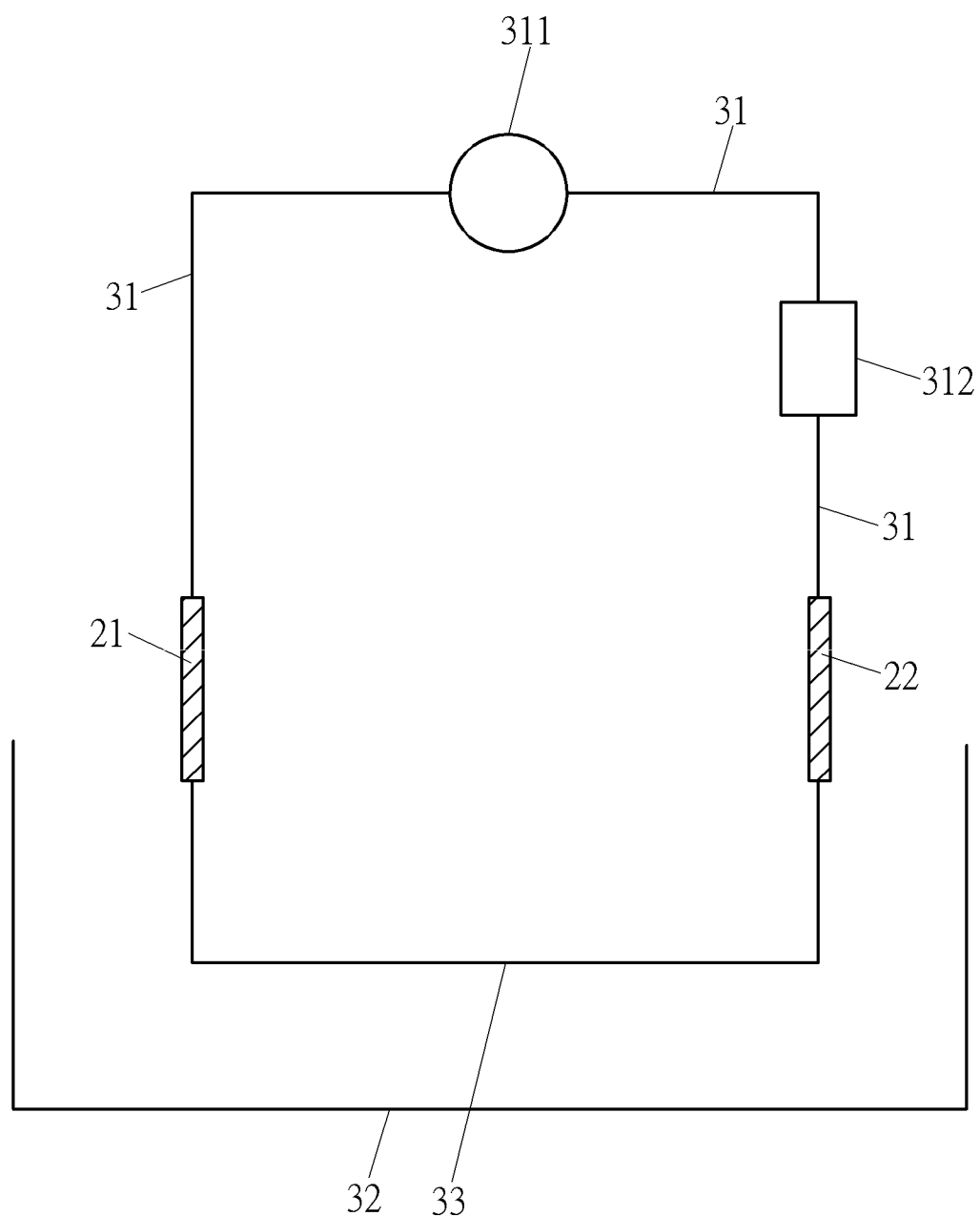
FIG. 3 is a schematic view illustrating a circuit of an assembly system warning device when a first assembly member is located at an assembly position and a second assembly member is located at an idle position.
Figure 4:
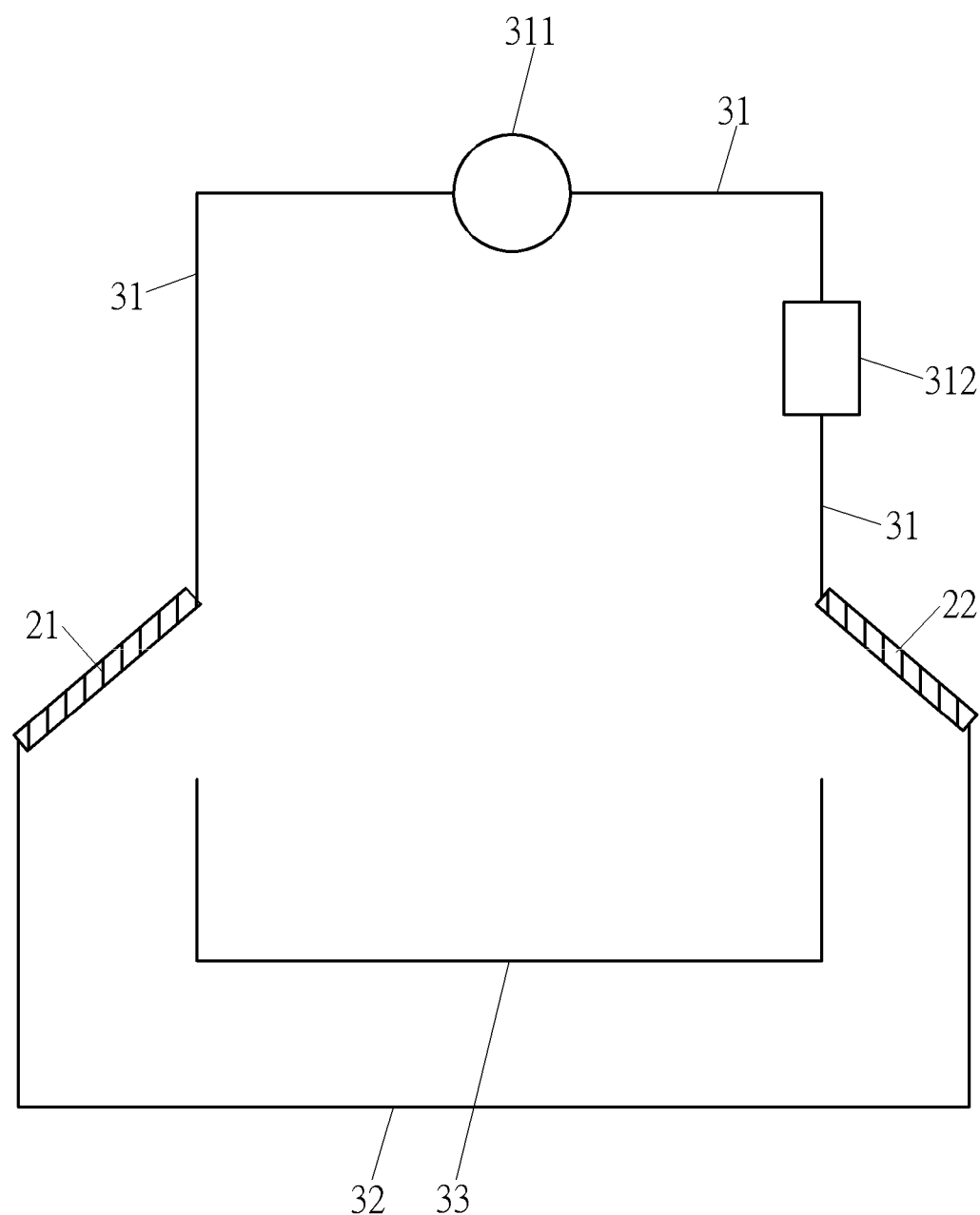
FIG. 4 is a schematic view illustrating a circuit of an assembly system warning device when a second assembly member is located at an assembly position and a first assembly member is located at an idle position.
Figure 5:
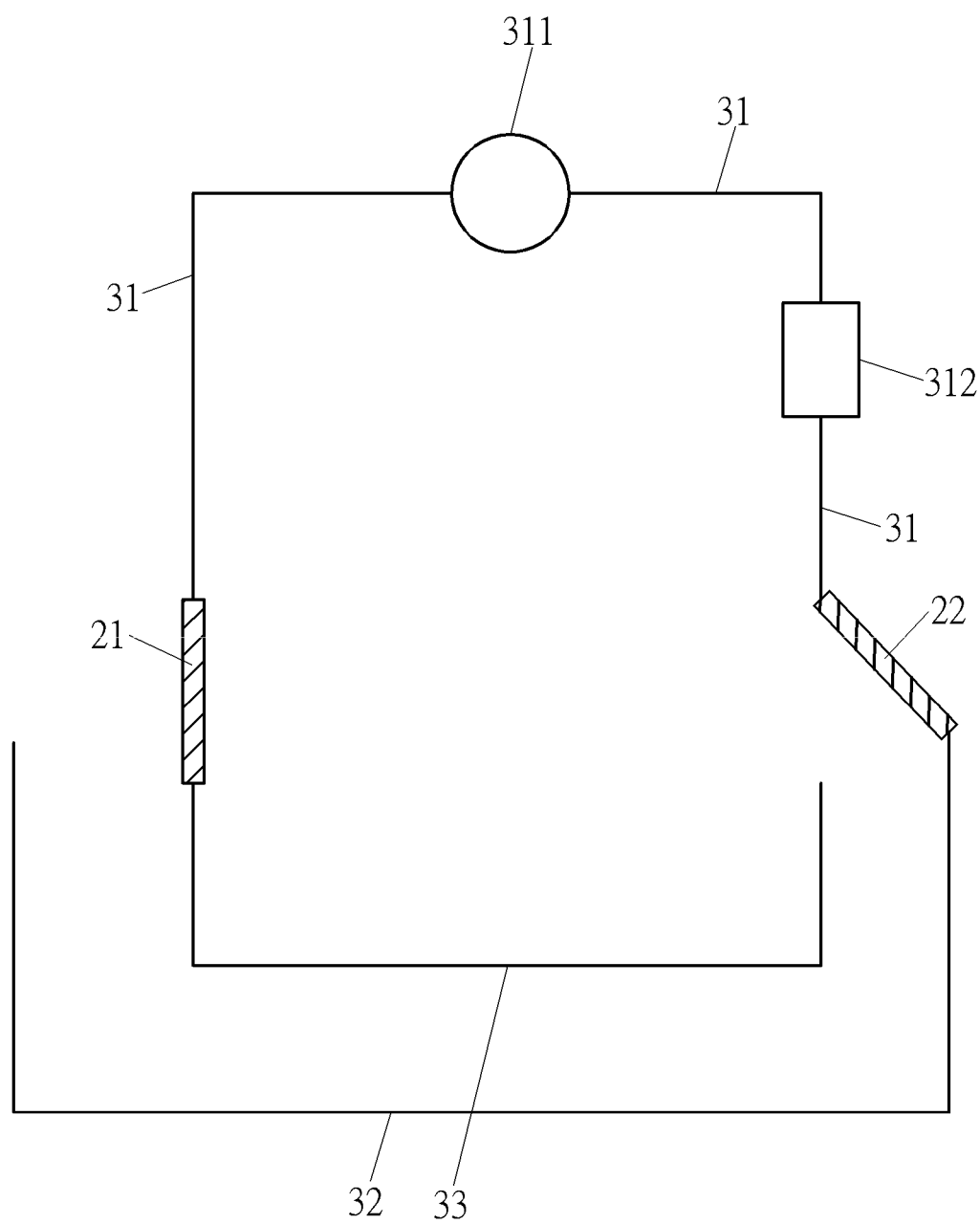
FIG. 5 is a schematic view illustrating a circuit of an assembly system warning device when a first assembly member and a second assembly member both are located at assembly positions.

As shown in FIGS. 2 to 5, in the first embodiment of the invention, the assembly system warning device 100 further comprises an alarm device 311, a first switch 21, a second switch 22, a main circuit 31, a first circuit 32, a second circuit 33 and a power supply 312. The main circuit 31 has a first end and a second end and is connected in series with the power supply 312 and the alarm device 311. Preferably, the power supply 312 may be, but not limited to, a battery disposed on the seat body 201. The battery may be a mobile power supply 312 or an external power supply 312, such as a power supply 312 of the vehicle. The first switch 21 has a first end electrically connected to the first end of the main circuit 31 and a second end selectively and electrically connected between the first circuit 32 and the second circuit 33. The second switch 22 has a first end electrically connected to the second end of the main circuit 31 and a second end selectively and electrically connected between the first circuit 32 and the second circuit 33. When the first assembly member 11 and the second assembly member 12 both are located at the idle positions, the first assembly member 11 and the second assembly member 12 do not assemble the seat body 201 of the child safety seat 200 to the corresponding assembly positions. The main circuit 31, the first circuit 32 and the second circuit 33 form an open circuit, as shown in FIG. 2. The alarm device 311 is turned off and does not send out an alarm for warning the user. When the first assembly member 11 is located at the assembly position and the second assembly member 12 is located at the idle position, the first assembly member 11 triggers the second end of the first switch 21 to be disconnected from the first circuit 32 and electrically connected to a second end of the second circuit 33, such that the main circuit 31 and the second circuit 33 are connected in series to form a closed circuit, as shown in FIG. 3, and then the alarm device 311 is turned on to send out an alarm for warning the user that the second assembly member 12 has not been connected to the vehicle yet, i.e. warning the user of uncompleted and incorrect assembly. Alternatively, when the second assembly member 12 is located at the assembly position and the first assembly member 11 is located at the idle position, the second assembly member 12 triggers the second end of the second switch 22 to be disconnected from the second circuit 33 and electrically connected to a second end of the first circuit 32, such that the main circuit 31 and the first circuit 32 are connected in series to form a closed circuit, as shown in FIG. 4, and then the alarm device 311 is turned on to send out an alarm for warning the user that the first assembly member 11 has not been connected to the vehicle yet, i.e. warning the user of uncompleted and incorrect assembly. When the first assembly member 11 and the second assembly member 12 both are located at the assembly positions, i.e. the first assembly member 11 and the second assembly member 12 both have assembled the seat body 201 of the child safety seat 200 to the corresponding assembly positions, the main circuit 31, the first circuit 32 and the second circuit 33 form an open circuit, as shown in FIG. 5, such that the alarm device 311 is turned off and does not send out an alarm.

Figure 6:
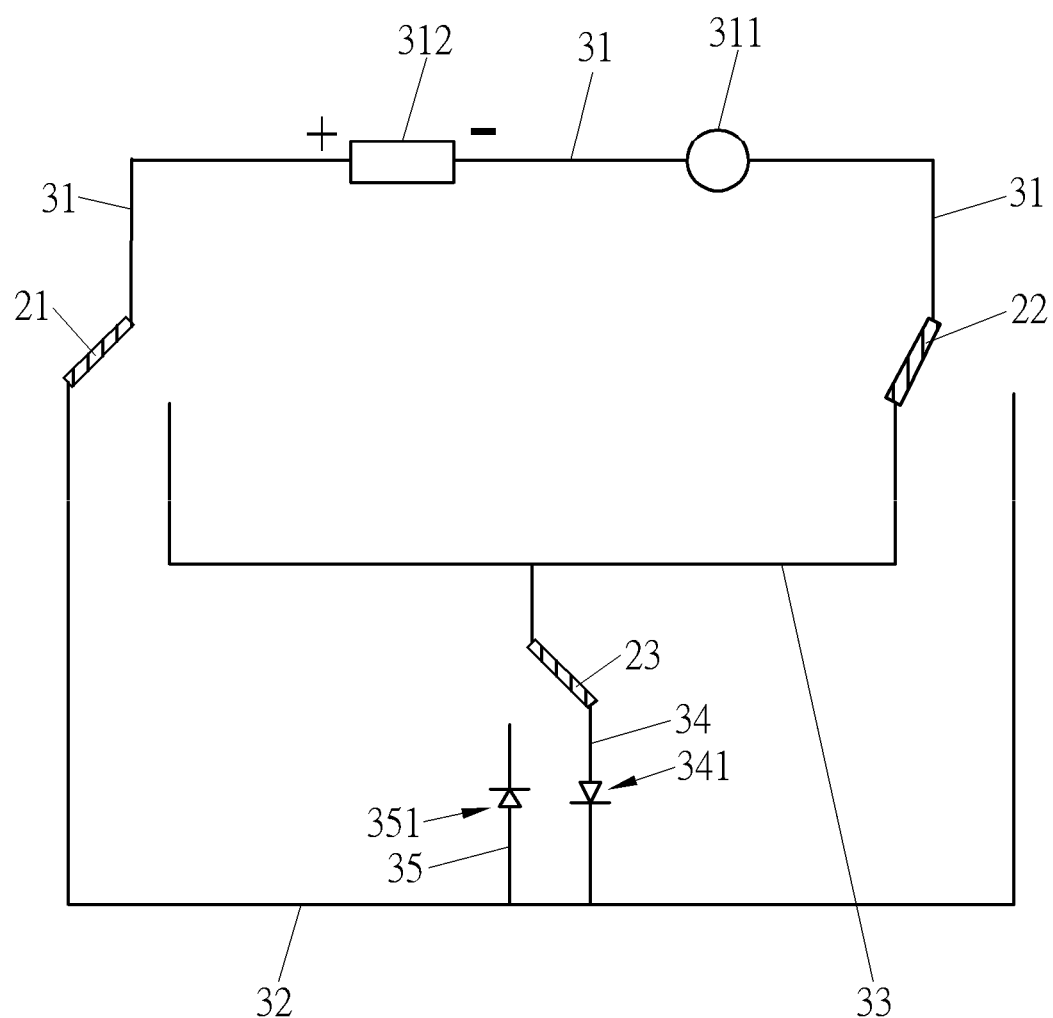
FIG. 6 is a schematic view illustrating a circuit of an assembly system warning device of a second embodiment of the invention.
Figure 7:
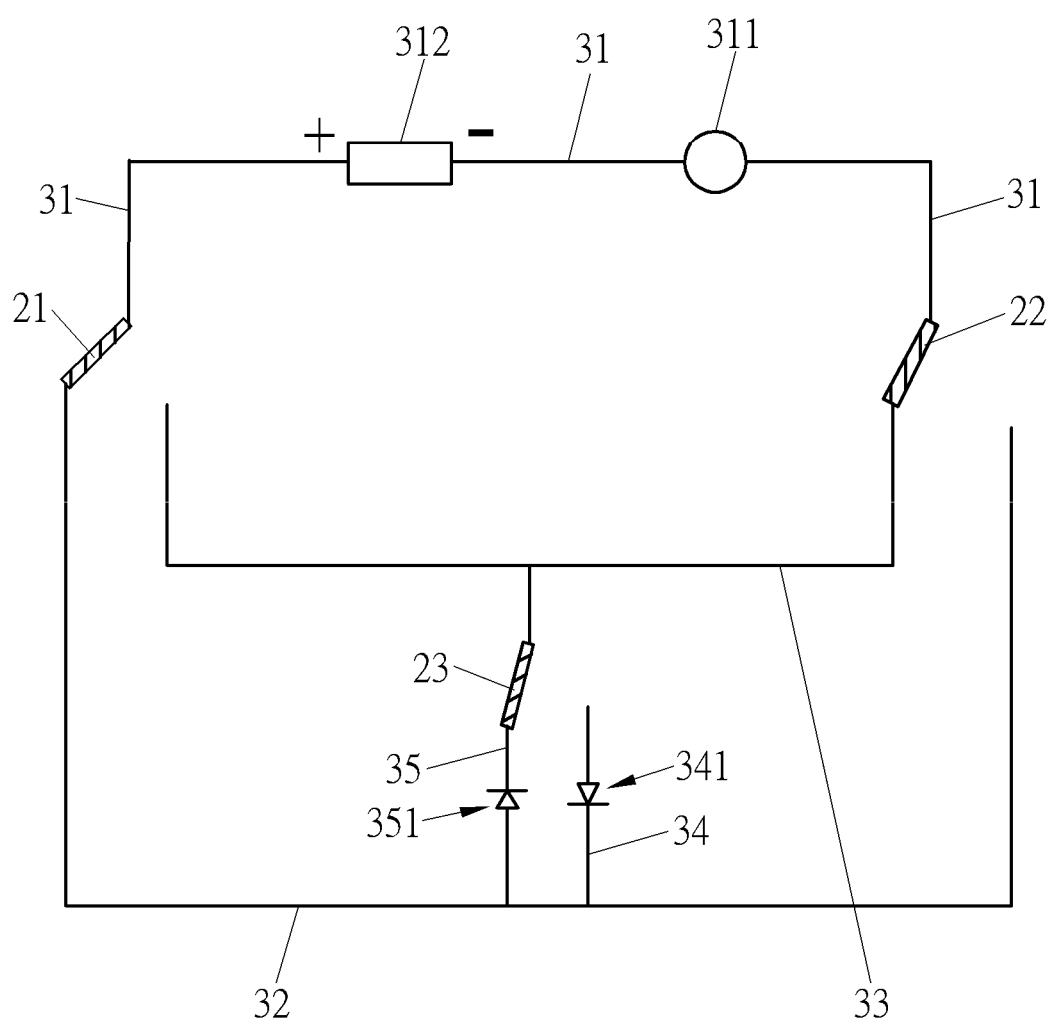
FIG. 7 is a schematic view illustrating a circuit of an assembly system warning device when a third assembly member is located at an assembly position and a first assembly and a second assembly member both are located at idle positions.
Figure 8:
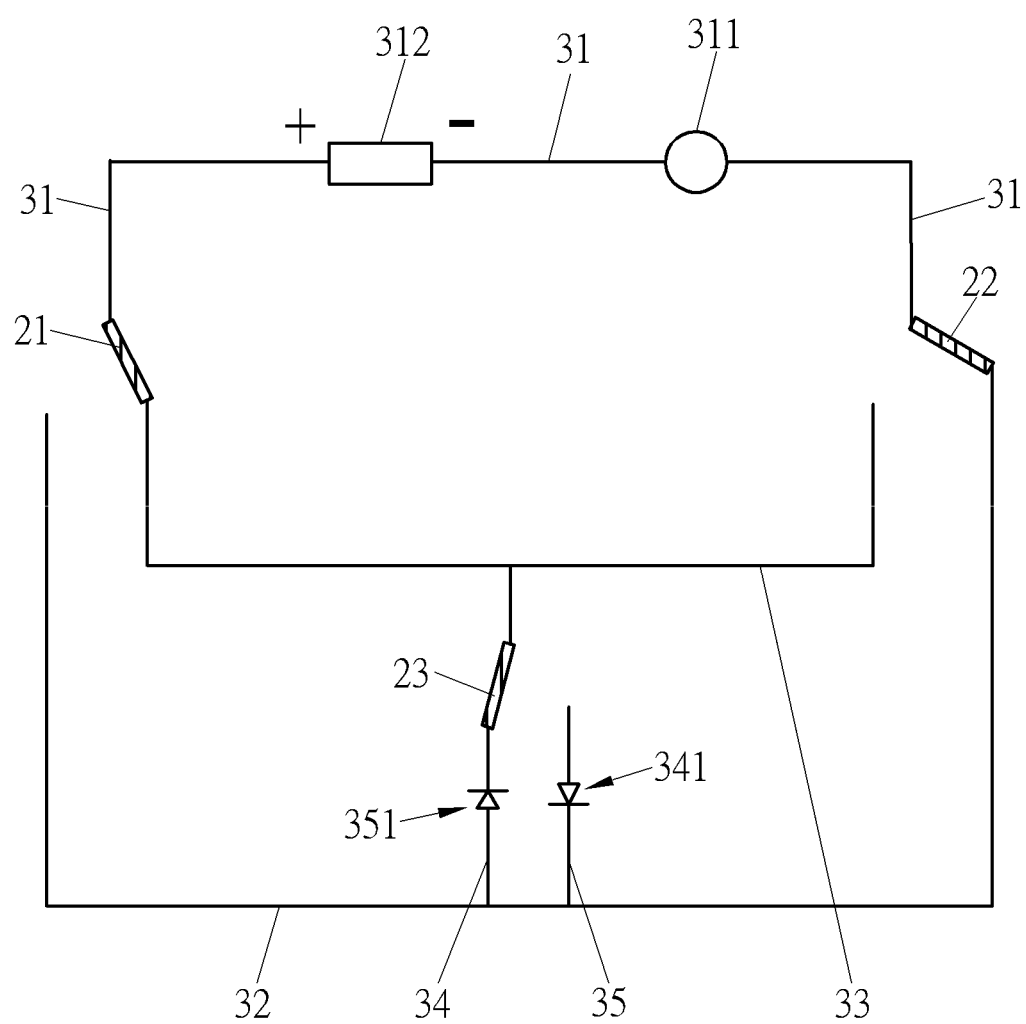
FIG. 8 is a schematic view illustrating a circuit of an assembly system warning device when a first assembly member, a second assembly member and a third assembly member all are located at assembly positions.

Referring to FIGS. 6 to 8, in a second embodiment of the invention, the assembly system warning device 100 based on the first embodiment further comprises a third switch 23, a third circuit 34, a fourth circuit 35 and a third assembly member 13 configured to assemble the seat body 201 into the vehicle. A first end of the third switch 23 is electrically connected to the second circuit 33. A first end of the third circuit 34 is electrically connected to the first circuit 32 and the third circuit 34 has a first diode 341. A first end of the fourth circuit 35 is electrically connected to the first circuit 32 and the fourth circuit 35 has a second diode 351. A current conducting direction of the first diode 341 is opposite to a current conducting direction of the second diode 351. The third assembly member 13 also has an assembly position and an idle position with respect to the seat body 201. When the third assembly member 13 is located at the assembly position, the third assembly member 13 extends from the seat body 201. When the third assembly member 13 is located at the idle position, the third assembly member 13 is stored at a storage position of the seat body 201. When the first assembly member 11, the second assembly member 12 and the third assembly member 13 all are assembled to the corresponding assembly positions, the seat body 201 of the child safety seat 200 is assembled into the vehicle completely. The third assembly member 13 is an abutting member or an anchor member. The abutting member is a spin-preventing supporting device or a rebound bar of the child safety seat. The anchor member is a top tether, an ISOFIX fixing member or a seat belt fastener. In this embodiment, the third assembly member 13 is, but not limited to, an ISOFIX fixing member. The third assembly member 13 may also be a top tether, a spin-preventing supporting device, a rebound bar of the child safety seat, a seat belt fastener, and so on. When the first assembly member 11, the second assembly member 12 and the third assembly member 13 all are located at the idle positions, a second end of the third switch 23 is electrically connected to a second end of the third circuit 34 and the first diode 341 is turned off, as shown in FIG. 6. The forward current generated by the power supply 312 flows from the main circuit 31 to the first circuit 32 via the first switch 21. Since the first diode 341 is turned off, the first diode 341 does not conduct current. Furthermore, the second circuit 33 is disconnected from the first circuit 32 to form an open circuit. Accordingly, the alarm device 311 is turned off and does not send out an alarm for warning the user. When the third assembly member 13 is located at the assembly position and the first assembly member 11 and the second assembly member 12 are located at the idle positions, the third assembly member 13 triggers the second end of the third switch 23 to be electrically connected to a second end of the fourth circuit 35 and the second diode 351 is turned on, as shown in FIG. 7. Since the current conducting direction of the first diode 341 is opposite to the current conducting direction of the second diode 351, the forward current generated by the power supply 312 can pass through the second diode 351 and flow from the fourth circuit 35 to the second circuit 33 after flowing from the main circuit 31 to the first circuit 32 via the first switch 21. Then, the forward current generated by the power supply 312 flows to the main circuit 31 via the second switch 22 to form a closed circuit, such that the alarm device 311 is turned on to send out an alarm for warning the user that the first assembly member 11 and the second assembly member 12 have not been connected to the vehicle yet, i.e. warning the user of uncompleted and incorrect assembly. It should be noted that, in the second embodiment, the closed circuit will be formed as long as one or two of the first assembly member 11, the second assembly member 12 and the third assembly member 13 are assembled to the corresponding assembly positions, such that the alarm device 311 is turned on to send out an alarm. When the first assembly member 11, the second assembly member 12 and the third assembly member 13 all are assembled to the corresponding assembly positions or located at the idle positions, i.e. the first assembly member 11, the second assembly member 12 and the third assembly member 13 all have or have not been assembled into the vehicle, the open circuit is formed, such that the alarm device 311 does not send out an alarm.

Figure 9:
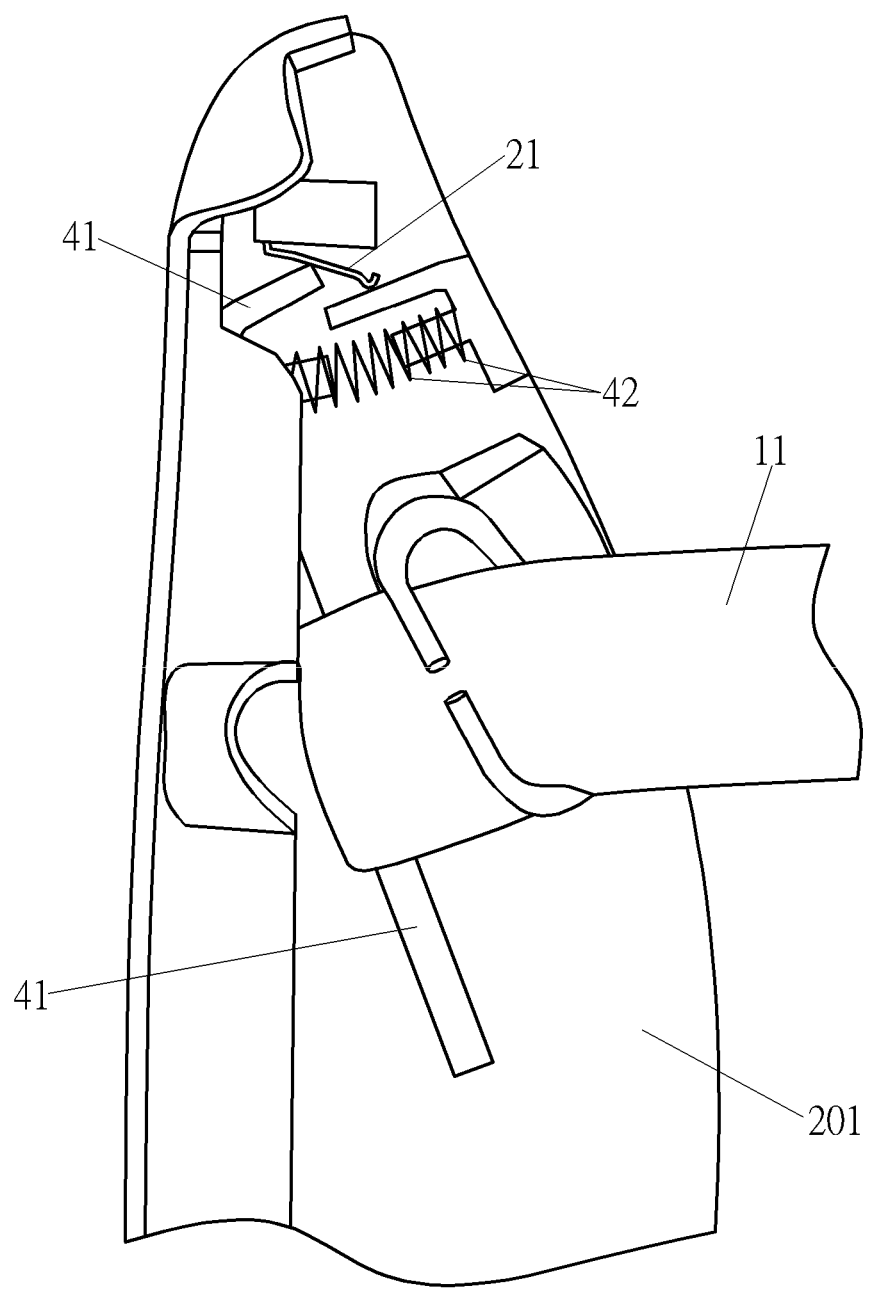
FIG. 9 is a schematic view illustrating a first driving unit of an assembly system warning device of the invention not pushing a first switch.
Figure 10:
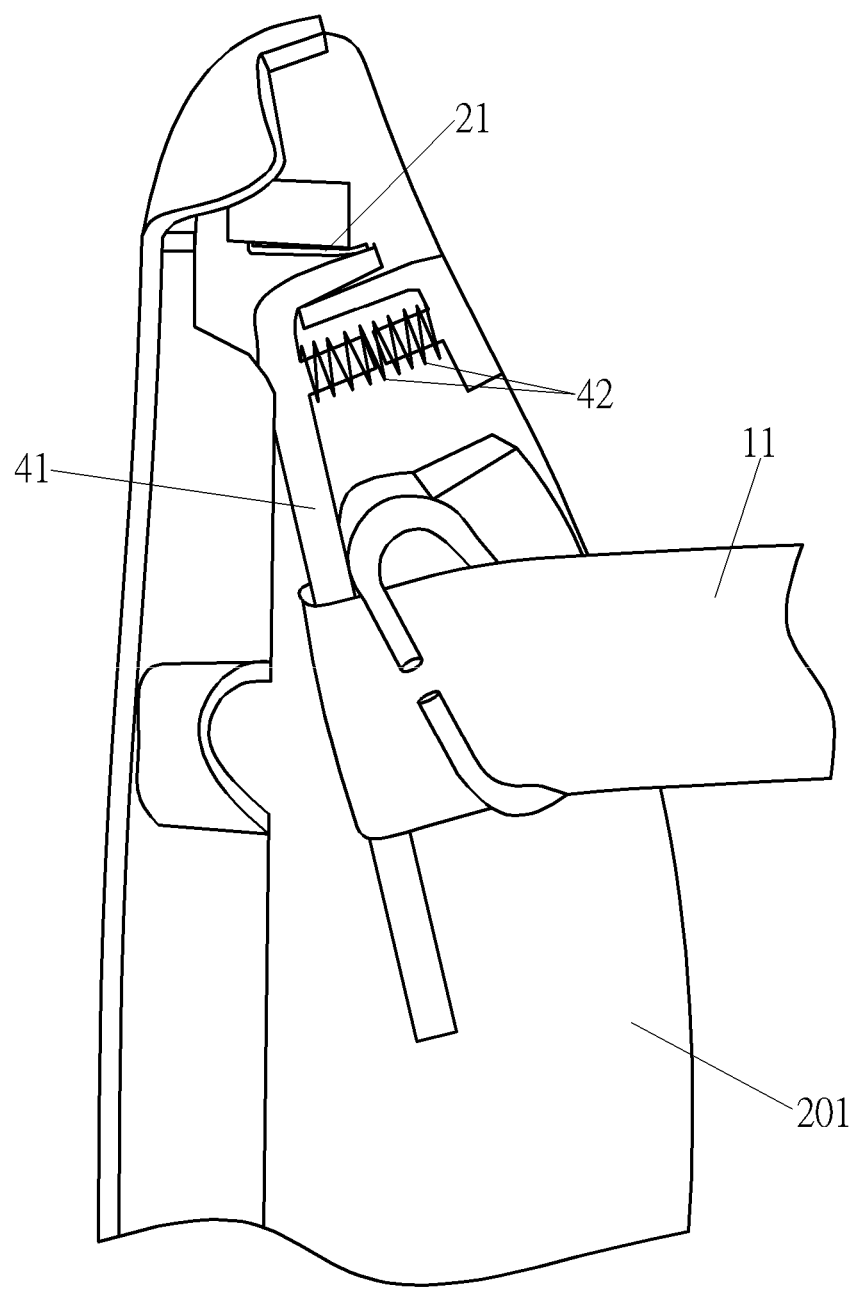
FIG. 10 is a schematic view illustrating a first assembly member of an assembly system warning device of the invention driving a first driving unit to push a first switch.
Figure 11:
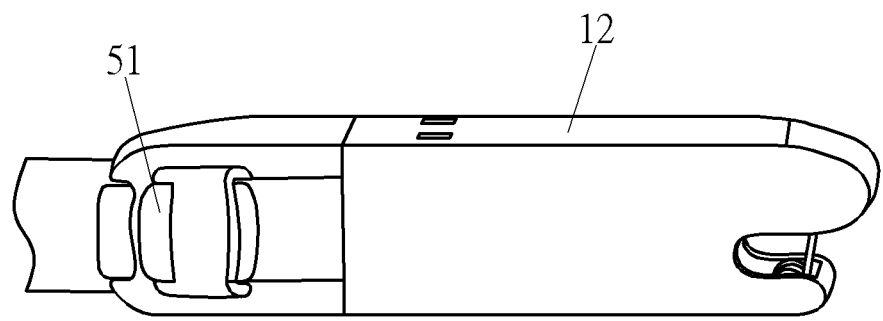
FIG. 11 is schematic view illustrating a second driving unit of an assembly system warning device of the invention disposed on a second assembly member.
Figure 12:
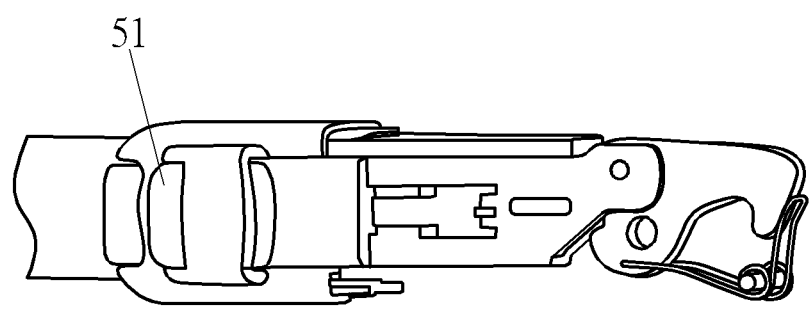
FIG. 12 is a schematic view illustrating a casing of the second assembly member shown in FIG. 11 being removed.
Figure 13:
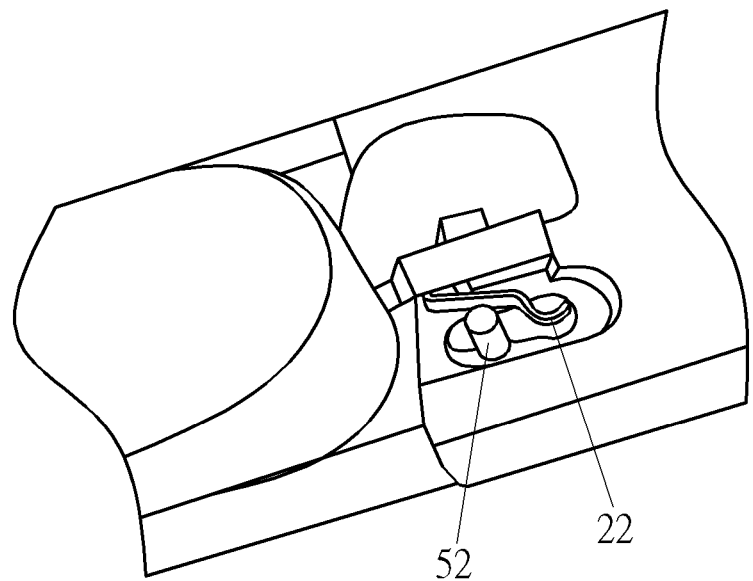
FIG. 13 is a schematic view illustrating a second driving unit of an assembly system warning device of the invention not pushing a second switch.
Figure 14:
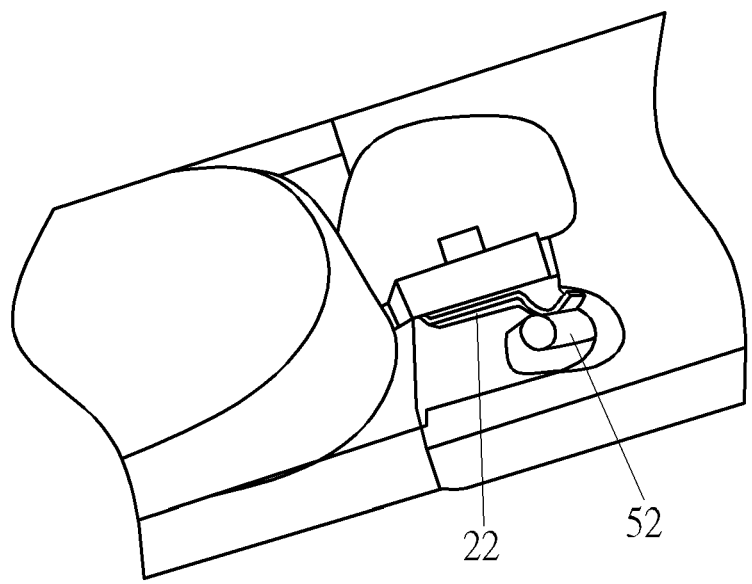
FIG. 14 is a schematic view illustrating a second assembly member of an assembly system warning device of the invention driving a second driving unit to push a second switch.

Referring to FIGS. 1, 9 and 10, to enable the first assembly member 11 to trigger the second end of the first switch 21 to be disconnected from the first circuit 32 and electrically connected to the second end of the second circuit 22, a first driving unit is disposed between the first assembly member 11 and the first switch 21. When the first assembly member 11 moves to the assembly position and drives the first driving unit to move, the first driving unit triggers the second end of the first switch 21 to be disconnected from the first circuit 32 and electrically connected to the second circuit 22. In this embodiment, the first driving unit comprises a first driving member 41. The first driving member 41 is pivotally connected to the seat body 201. The first assembly member 11 is disposed on the first driving member 41. When the first assembly member 11 drives the first driving member 41 to rotate, the first driving member 41 pushes and triggers the first switch 21. When the first assembly member 11 is separated from the assembly position and returns to the idle position, the first switch 21 has to be disconnected from the second circuit 33 and electrically reconnected to the first circuit 32, i.e. the first switch 21 has to return to the initial position. Thus, the first driving unit further comprises an elastic member 42 configured to return the first driving member 41. The elastic member 42 is disposed between the first driving member 41 and the seat body 201. When the first assembly member 11 moves from the idle position to the assembly position to drive the first driving member 41 to rotate, the first driving member 41 compresses the elastic member 42 and pushes the first switch 21. When the first assembly member 11 moves from the assembly position to the idle position, an elastic force of the elastic member 42 pushes the first driving member 41 to return to the initial position. Since the first driving member 41 does not push the second end of the first switch 21 anymore, the second end of the first switch 21 returns to the initial position and then is electrically reconnected to the first circuit 32. The first switch 21 may be a switch with elasticity and the elastic member 42 may be a spring.

Referring to FIGS. 1 and 11 to 14, a second driving unit is disposed between the second assembly member 12 and the second switch 22. When the second assembly member 12 moves to the assembly position and drives the second driving unit to move, the second driving unit triggers the second end of the second switch 22 to be disconnected from the second circuit 33 and electrically connected to the first circuit 32. In this embodiment, the second driving unit comprises an unlock member 51 and a second driving member 52. The unlock member 51 is disposed on the second assembly member 12. The second driving member 52 is connected to the unlock member 51. When the second assembly member 12 drives the unlock member 51 to move, the unlock member 51 drives the second driving member 52 to push and trigger the second switch 22. The second switch 22 may be, but not limited to, a switch with elasticity and the unlock member 51 may be, but not limited to, an unlock button.

As mentioned in the above, the child safety seat 200 of the invention is equipped with the assembly system warning device 100. When the first assembly member 11 is located at the assembly position and the second assembly member 12 is located at the idle position, the first assembly member 11 triggers the second end of the first switch 21 to be disconnected from the first circuit 32 and electrically connected to the second end of the second circuit 33, such that the main circuit 31 and the second circuit 33 are connected in series to form a closed circuit and then the alarm device 311 is turned on to send out an alarm for warning the user that the second assembly member 12 has not been connected to the vehicle yet, i.e. warning the user of uncompleted and incorrect assembly. When the second assembly member 12 is located at the assembly position and the first assembly member 11 is located at the idle position, the second assembly member 12 triggers the second end of the second switch 22 to be disconnected from the second circuit 33 and electrically connected to the second end of the first circuit 32, such that the main circuit 31 and the first circuit 32 are connected in series to form a closed circuit and then the alarm device 311 is turned on to send out an alarm for warning the user that the first assembly member 11 has not been connected to the vehicle yet, i.e. warning the user of uncompleted and incorrect assembly. When the first assembly member 11 and the second assembly member 12 both are located at the assembly positions or the idle positions, i.e. the first assembly member 11 and the second assembly member 12 both have or have not been assembled into the vehicle, the main circuit 31, the first circuit 32 and the second circuit 33 form an open circuit, such that the alarm device 311 is turned off and does not send out an alarm.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An assembly system warning device disposed on a child safety seat, the assembly system warning device comprising:
   a first assembly member and a second assembly member configured to assemble the child safety seat into a vehicle, each of the first assembly member and the second assembly member having an assembly position and an idle position with respect to the child safety seat;
   a main circuit having a first end and a second end and being connected in series with a power supply and an alarm device;
   a first circuit;
   a second circuit;
   a first switch having a first end electrically connected to the first end of the main circuit and a second end selectively and electrically connected between the first circuit and the second circuit; and
   a second switch having a first end electrically connected to the second end of the main circuit and a second end selectively and electrically connected between the first circuit and the second circuit;
   wherein when the first assembly member is located at the assembly position and the second assembly member is located at the idle position, the main circuit and the second circuit are connected in series to form a closed circuit; when the second assembly member is located at the assembly position and the first assembly member is located at the idle position, the main circuit and the first circuit are connected in series to form a closed circuit.

2. The assembly system warning device of claim 1, wherein when the first assembly member is located at the assembly position and the second assembly member is located at the idle position, the first assembly member triggers the second end of the first switch to be disconnected from the first circuit and electrically connected to the second circuit, so as to form a closed circuit and send out an alarm; when the second assembly member is located at the assembly position and the first assembly member is located at the idle position, the second assembly member triggers the second end of the second switch to be disconnected from the second circuit and electrically connected to the first circuit, so as to form a closed circuit and send out an alarm.

3. The assembly system warning device of claim 1, wherein when the first assembly member and the second assembly member are located at the assembly positions, the first assembly member and the second assembly member extend from the child safety seat; when the first assembly member and the second assembly member are located at the idle positions, the first assembly member and the second assembly member are stored at storage positions of the child safety seat.

4. The assembly system warning device of claim 1, wherein at least one of the first assembly member and the second assembly member is an abutting member or an anchor member.

5. The assembly system warning device of claim 4, wherein the abutting member is a spin-preventing supporting device or a rebound bar of the child safety seat.

6. The assembly system warning device of claim 4, wherein the anchor member is a top tether, an ISOFIX fixing member or a seat belt fastener.

7. The assembly system warning device of claim 1, further comprising:
   a third switch, a first end of the third switch being electrically connected to the second circuit;
   a third circuit, a first end of the third circuit being electrically connected to the first circuit, the third circuit having a first diode;
   a fourth circuit, a first end of the fourth circuit being electrically connected to the first circuit, the fourth circuit having a second diode, a current conducting direction of the first diode being opposite to a current conducting direction of the second diode; and
   a third assembly member configured to assemble the child safety seat into the vehicle, the third assembly member having an assembly position and an idle position with respect to the child safety seat;
   wherein when the first assembly member, the second assembly member and the third assembly member are located at the idle positions, a second end of the third switch is electrically connected to a second end of the third circuit and the first diode is turned off; when the third assembly member is located at the assembly position and the first assembly member and the second assembly member are located at the idle positions, the third assembly member triggers the second end of the third switch to be electrically connected to a second end of the fourth circuit and the second diode is turned on, so as to form a closed circuit and send out an alarm.

8. The assembly system warning device of claim 7, wherein when the first assembly member, the second assembly member and the third assembly member are located at the assembly positions, the first assembly member, the second assembly member and the third assembly member extend from the child safety seat; when the first assembly member, the second assembly member and the third assembly member are located at the idle positions, the first assembly member, the second assembly member and the third assembly member are stored at storage positions of the child safety seat.

9. The assembly system warning device of claim 7, wherein the third assembly member is an abutting member or an anchor member.

10. The assembly system warning device of claim 9, wherein the abutting member is a spin-preventing supporting device or a rebound bar of the child safety seat.

11. The assembly system warning device of claim 9, wherein the anchor member is a top tether, an ISOFIX fixing member or a seat belt fastener.

12. The assembly system warning device of claim 1, wherein a first driving unit is disposed between the first assembly member and the first switch; when the first assembly member moves to the assembly position and drives the first driving unit to move, the first driving unit triggers the second end of the first switch to be disconnected from the first circuit and electrically connected to the second circuit.

13. The assembly system warning device of claim 12, wherein the first driving unit comprises a first driving member, the first driving member is pivotally connected to the child safety seat, the first assembly member is disposed on the first driving member; when the first assembly member drives the first driving member to rotate, the first driving member pushes and triggers the first switch.

14. The assembly system warning device of claim 13, wherein the first driving unit further comprises an elastic member configured to return the first driving member, the elastic member is disposed between the first driving member and the child safety seat; when the first assembly member drives the first driving member to rotate, the first driving member compresses the elastic member.

15. The assembly system warning device of claim 1, wherein a second driving unit is disposed between the second assembly member and the second switch; when the second assembly member moves to the assembly position and drives the second driving unit to move, the second driving unit triggers the second end of the second switch to be disconnected from the second circuit and electrically connected to the first circuit.

16. The assembly system warning device of claim 15, wherein the second driving unit comprises an unlock member and a second driving member, the unlock member is disposed on the second assembly member, the second driving member is connected to the unlock member; when the second assembly member drives the unlock member to move, the unlock member drives the second driving member to push and trigger the second switch.

17. A child safety seat comprising:
a seat body; and
an assembly system warning device disposed on the seat body, the assembly system warning device comprising:
 a first assembly member and a second assembly member configured to assemble the seat body into a vehicle, each of the first assembly member and the second assembly member having an assembly position and an idle position with respect to the seat body;
 a main circuit having a first end and a second end and being connected in series with a power supply and an alarm device;
 a first circuit;
 a second circuit;
 a first switch having a first end electrically connected to the first end of the main circuit and a second end selectively and electrically connected between the first circuit and the second circuit; and
 a second switch having a first end electrically connected to the second end of the main circuit and a second end selectively and electrically connected between the first circuit and the second circuit;
 wherein when the first assembly member is located at the assembly position and the second assembly member is located at the idle position, the main circuit and the second circuit are connected in series to form a closed circuit; when the second assembly member is located at the assembly position and the first assembly member is located at the idle position, the main circuit and the first circuit are connected in series to form a closed circuit.

18. The child safety seat of claim 17, wherein when the first assembly member is located at the assembly position and the second assembly member is located at the idle position, the first assembly member triggers the second end of the first switch to be disconnected from the first circuit and electrically connected to the second circuit, so as to form a closed circuit and send out an alarm; when the second assembly member is located at the assembly position and the first assembly member is located at the idle position, the second assembly member triggers the second end of the second switch to be disconnected from the second circuit and electrically connected to the first circuit, so as to form a closed circuit and send out an alarm.

19. The child safety seat of claim 17, wherein the assembly system warning device further comprises:
 a third switch, a first end of the third switch being electrically connected to the second circuit;
 a third circuit, a first end of the third circuit being electrically connected to the first circuit, the third circuit having a first diode;
 a fourth circuit, a first end of the fourth circuit being electrically connected to the first circuit, the fourth circuit having a second diode, a current conducting direction of the first diode being opposite to a current conducting direction of the second diode; and
 a third assembly member configured to assemble the seat body into the vehicle, the third assembly member having an assembly position and an idle position with respect to the seat body;
 wherein when the first assembly member, the second assembly member and the third assembly member are located at the idle positions, a second end of the third switch is electrically connected to a second end of the third circuit and the first diode is turned off; when the third assembly member is located at the assembly position and the first assembly member and the second assembly member are located at the idle positions, the third assembly member triggers the second end of the third switch to be electrically connected to a second end of the fourth circuit and the second diode is turned on, so as to form a closed circuit and send out an alarm.

20. The child safety seat of claim 17, wherein a first driving unit is disposed between the first assembly member and the first switch; when the first assembly member moves to the assembly position and drives the first driving unit to move, the first driving unit triggers the second end of the first switch to be disconnected from the first circuit and electrically connected to the second end of the second circuit.

21. The child safety seat of claim 17, wherein a second driving unit is disposed between the second assembly member and the second switch; when the second assembly member moves to the assembly position and drives the second driving unit to move, the second driving unit triggers the second end of the second switch to be disconnected from the second circuit and electrically connected to the second end of the first circuit.

* * * * *